United States Patent
Lee et al.

(10) Patent No.: US 10,069,771 B2
(45) Date of Patent: Sep. 4, 2018

(54) DIGITAL DEVICE AND METHOD OF CONTROLLING THEREFOR

(71) Applicant: LG ELECTRONICS INC., Seoul (KR)

(72) Inventors: Juhwan Lee, Seoul (KR); Sihwa Park, Seoul (KR); Sinae Chun, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 547 days.

(21) Appl. No.: 14/642,087

(22) Filed: Mar. 9, 2015

(65) Prior Publication Data

US 2016/0191429 A1  Jun. 30, 2016

(30) Foreign Application Priority Data

Dec. 26, 2014  (KR) .................. 10-2014-0190792

(51) Int. Cl.
| | |
|---|---|
| H04L 12/58 | (2006.01) |
| G06F 3/0481 | (2013.01) |
| G06F 3/0484 | (2013.01) |
| G06F 9/54 | (2006.01) |
| G06F 1/16 | (2006.01) |
| G06F 3/0485 | (2013.01) |
| G06F 3/0486 | (2013.01) |
| G06F 3/0488 | (2013.01) |

(52) U.S. Cl.
CPC ............ *H04L 51/046* (2013.01); *G06F 1/165* (2013.01); *G06F 1/1626* (2013.01); *G06F 1/1647* (2013.01); *G06F 1/1652* (2013.01); *G06F 3/0485* (2013.01); *G06F 3/0486* (2013.01); *G06F 3/04817* (2013.01); *G06F 3/04842* (2013.01); *G06F 3/04847* (2013.01); *G06F 3/04883* (2013.01); *G06F 3/04886* (2013.01); *G06F 9/542* (2013.01)

(58) Field of Classification Search
CPC ... H04L 51/046; G06F 1/1626; G06F 1/1647; G06F 1/165; G06F 1/1652; G06F 3/04817; G06F 3/04842; G06F 3/04847; G06F 3/0485; G06F 3/0486; G06F 3/04883; G06F 3/04886; G06F 9/542
See application file for complete search history.

(56) References Cited

U.S. PATENT DOCUMENTS

| | | | | |
|---|---|---|---|---|
| 9,152,211 | B2 * | 10/2015 | Gunn | G06F 3/0488 |
| 9,342,105 | B2 * | 5/2016 | Choi | G06F 1/1637 |
| 2009/0222748 | A1 * | 9/2009 | Lejeune | G06F 1/1616 |
| | | | | 715/764 |
| 2010/0060548 | A1 * | 3/2010 | Choi | G06F 3/0414 |
| | | | | 345/1.3 |

(Continued)

FOREIGN PATENT DOCUMENTS

EP  2 224 324 A1  9/2010

*Primary Examiner* — Stella Higgs
(74) *Attorney, Agent, or Firm* — Birch, Stewart, Kolasch & Birch, LLP (57) ABSTRACT

A digital device configured to check a notification of an application and a method of controlling therefor are disclosed. If an icon including an indicator is slid to a direction of a sub display area from a main display area by a slide touch input, the digital device according to the present specification can display notification information corresponding to the indicator on the sub display area.

17 Claims, 8 Drawing Sheets

(56) References Cited

U.S. PATENT DOCUMENTS

| | | | |
|---|---|---|---|
| 2010/0066643 A1* | 3/2010 | King | G06F 1/1616 345/1.3 |
| 2010/0117975 A1* | 5/2010 | Cho | G06F 1/1626 345/173 |
| 2010/0223569 A1* | 9/2010 | Vuong | G06F 3/04817 715/772 |
| 2011/0143815 A1* | 6/2011 | Inami | H04M 1/0235 455/566 |
| 2011/0151935 A1* | 6/2011 | Oksman | G06F 1/1624 455/566 |
| 2011/0260964 A1* | 10/2011 | Mujkic | G06F 3/0481 345/156 |
| 2011/0268218 A1* | 11/2011 | Kang | G06F 3/0482 375/295 |
| 2012/0013557 A1* | 1/2012 | Lee | G06F 3/04883 345/173 |
| 2012/0084697 A1* | 4/2012 | Reeves | G06F 1/1616 715/772 |
| 2012/0102437 A1* | 4/2012 | Worley | G06F 3/04883 715/863 |
| 2012/0127087 A1* | 5/2012 | Ma | G06F 1/1616 345/173 |
| 2012/0229399 A1* | 9/2012 | Kobayashi | G06F 3/0486 345/173 |
| 2012/0246577 A1* | 9/2012 | Klassen | G06F 3/0482 715/752 |
| 2012/0317498 A1* | 12/2012 | Logan | G06F 3/04817 715/752 |
| 2013/0036386 A1* | 2/2013 | Park | G06F 3/0485 715/831 |
| 2013/0076649 A1* | 3/2013 | Myers | H04M 1/0268 345/173 |
| 2013/0145295 A1* | 6/2013 | Bocking | G06F 3/017 715/764 |
| 2013/0159417 A1* | 6/2013 | Meckler | H04L 67/22 709/204 |
| 2013/0300697 A1 | 11/2013 | Kim et al. | |
| 2014/0004818 A1* | 1/2014 | Ward | G06F 3/0482 455/405 |
| 2014/0053097 A1* | 2/2014 | Shin | G06F 9/4443 715/779 |
| 2014/0300533 A1* | 10/2014 | Cho | G06F 3/041 345/156 |
| 2014/0310643 A1* | 10/2014 | Karmanenko | G06F 1/1626 715/784 |
| 2014/0351744 A1* | 11/2014 | Jeon | G06F 3/0482 715/781 |
| 2014/0370938 A1* | 12/2014 | Lee | H04M 1/72583 455/566 |
| 2015/0012881 A1* | 1/2015 | Song | G06F 3/04842 715/803 |
| 2015/0015513 A1* | 1/2015 | Kwak | G06F 3/0416 345/173 |
| 2015/0378592 A1* | 12/2015 | Kim | G06F 1/1628 715/765 |

* cited by examiner

DIGITAL DEVICE AND METHOD OF CONTROLLING THEREFOR

This application claims the benefit of the Korean Patent Application No. 10-2014-0190792, filed on Dec. 26, 2014, which is hereby incorporated by reference as if fully set forth herein.

BACKGROUND OF THE INVENTION

Field of the Invention

The present specification relates to a digital device and a method of controlling therefor.

Discussion of the Related Art

Recently, such a digital device as a smartphone is widely used. This sort of digital device provides a home screen including icons of various applications. The home screen may consist of a plurality of pages. A user may push the home screen or switch a page of the home screen by a slide touch.

Each of icons displayed on the home screen corresponds to an application and/or a widget. It there exists a notification for the application and/or the widget, a digital device may include an indicator corresponding to the notification together with the application and/or an application for the widget.

In general, the indicator indicates information on whether the notification exists and/or the number of notifications. Hence, in order for a user to check content of the notification, the user should execute the application and/or the widget.

In order to improve the aforementioned inconvenience, a display device may display information of a notification on the top of a display area or a pop-up window when the notification occurs.

Yet, the display device can display information of a most recently occurred notification only in general. Moreover, in case of displaying the information of the notification using the pop-up window, a part of the display area is blocked by the pop-up window. Hence, it is required to have a method of displaying information of a notification preferred by a user while the display area in use is not blocked.

SUMMARY OF THE INVENTION

Accordingly, the present specification is directed to an apparatus and method thereof that substantially obviate one or more problems due to limitations and disadvantages of the related art. An object of the present specification is to provide a digital device displaying notification information using a more intuitive user interface and a method of controlling therefor. In particular, the present specification intends to provide enhanced user experience to a user by providing the notification information based on a slide touch input heading to a sub display area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a digital device includes a storage unit configured to store data, a display unit configured to display one or more images, receive a touch input and include a main display area and a sub display area and a processor configured to control the storage unit and the display unit, the processor further configured to display a first icon set including one or more icons corresponding to applications different from each other on the main display area, the processor further configured to display an indicator for a notification in a manner of adding the indicator to an icon corresponding to an application in response to the notification on the application, wherein the first icon set includes at least one of an icon to which the indicator is added and an icon to which the indicator is not added, the processor further configured to slide the first icon set to a direction of the sub display area from the main display area based on a slide touch input inputted on the main display area, the processor, if at least one or more icons belonging to the first icon set, which is slid to a predetermined area positioned in the vicinity of a boundary between the main display area and the sub display area, include the indicator, further configured to display notification information corresponding to the indicator on the sub display area.

To further achieve these objects and other advantages and in accordance with the purpose of the invention, as embodied and broadly described herein, according to one embodiment, a method of controlling a digital device including a main display area and a sub display area includes the steps of displaying a first icon set including one or more icons corresponding to applications different from each other on the main display area, displaying an indicator for a notification in a manner of adding the indicator to an icon corresponding to an application in response to the notification on the application, wherein the first icon set includes at least one of an icon to which the indicator is added and an icon to which the indicator is not added, sliding the first icon set to a direction of the sub display area from the main display area based on a slide touch input inputted on the main display area and if at least one or more icons belonging to the first icon set, which is slid to a predetermined area positioned in the vicinity of a boundary between the main display area and the sub display area, include the indicator, displaying notification information corresponding to the indicator on the sub display area.

According to the present specification, a digital device enables a user to more easily check preferred notification information.

According to the present specification, a digital device can provide a more enhanced user interface to a user.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present specification, examples of which are illustrated in the accompanying drawings. While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

A digital device according to the present specification can include a different portable device including a camera, a cellular phone, a wireless communication telephone, a smartphone, a tablet PC, a PDA (personal digital assistant) and a display.

Figure 1:
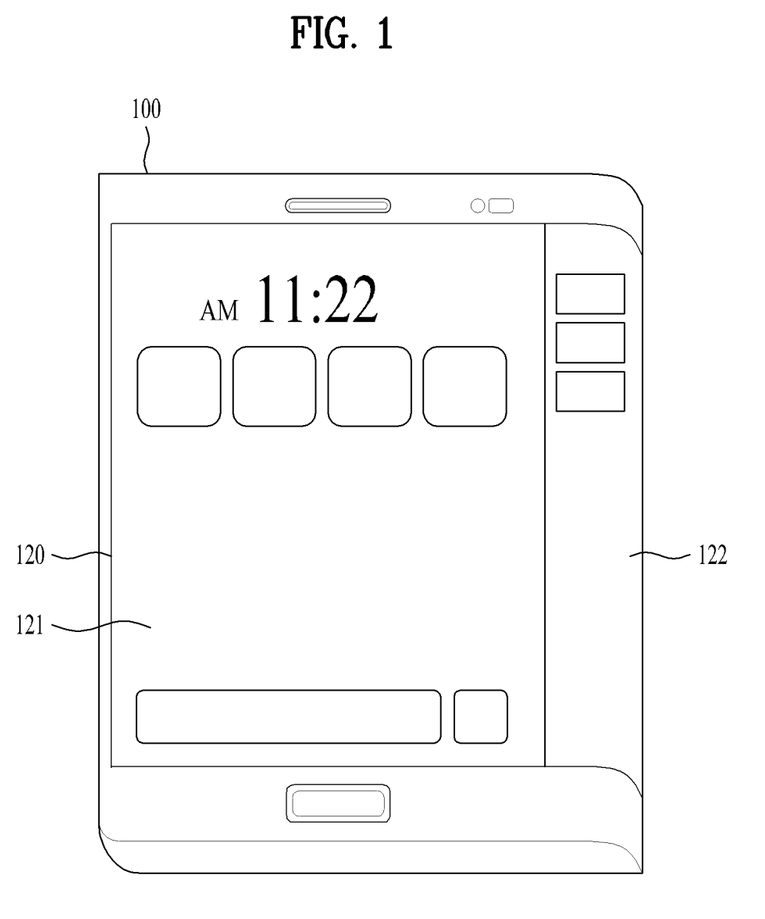
FIG. 1 is a diagram for a digital device according to one embodiment.

FIG. 1 is a diagram for a digital device according to one embodiment.

FIG. 1 shows a digital device 100 including a display unit 120. For instance, the display unit 120 may include a main display area 121 and a sub display area 122. In general, the sub display area 122 is arranged in the vicinity of the main display area 121. For instance, as shown in FIG. 1, the sub display area 122 may correspond to an edge display. And, the sub display area 122 may include a flexible display, a retractable display and/or a stretchable display.

In general, the sub display area 122 can display a notification or notification information on a most recently occurred event. For instance, an event can include a text message, a short message, a multimedia message, a missed call, a notification of an application and the like. When there exist a plurality of notifications for the digital device 100, a user may want to check information on a specific notification only. Hence, it is required to have a method of displaying information on a preferred notification only among a plurality of the notifications.

Figure 2:
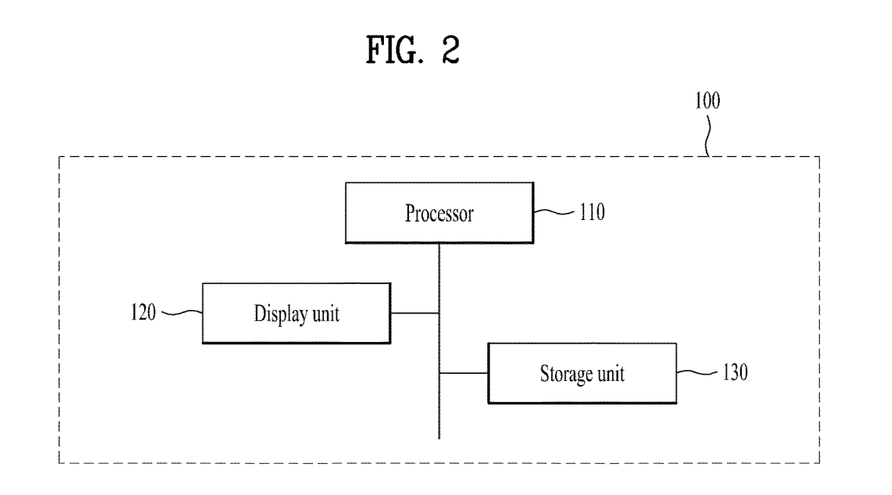
FIG. 2 is a block diagram for a digital device according to one embodiment.

FIG. 2 is a block diagram for a digital device according to one embodiment.

A digital device 100 may include a storage unit 130, a display unit 120 and a processor 110.

The storage unit 130 can store data. The storage unit 130 can be implemented by a chip or a plurality of chips. The storage unit can store a data, a multimedia data, a system data and the like. And, the processor 110 can control the digital device 100 using a data stored in the storage unit 130. The storage unit 130 may correspond to one of various digital information storage spaces including a flash memory, a RAM (random access memory), an SSD (solid state drive) and the like.

The display unit 120 displays one or more images and can receive a touch input. And, the display unit 120 can include a main display area and a sub display area. As mentioned earlier with reference to FIG. 1, the sub display area may correspond to an edge display. The display unit 120 can include a LCD (liquid crystal display), a plasma display or a display of a different form. And, the display unit 120 can include a flexible display, a rollable display and/or a foldable display. And, the display unit 120 may include a touch sensor. In particular, the display unit 120 may include a touch sensor. The touch sensor can be positioned on the display unit 120 or in the display unit 120. The touch sensor can sense contact or non-contact various touch inputs including a sliding touch input, a multi touch input, a long-press touch input, a short-press touch input, a drag touch input, a hovering input, a flicking touch input and the like. Moreover, the touch sensor can sense a touch input inputted by various input tools including a touch pen, a stylus pen and the like. The touch sensor can deliver a result of sensing a touch input to the processor 110.

The processor 110 can control the storage unit 130 and the display unit 120. The processor 110 can execute various applications by processing data of the digital device 100. The processor 110 can control the digital device 100 and contents executed in the digital device 100 based on a command.

Meanwhile, a composition diagram of the digital device shown in FIG. 2 corresponds to a block diagram according to one embodiment of the present specification. Blocks, which are represented in a manner of being divided, show hardware configuration units of the digital device 100 logically divided from each other. Hence, the aforementioned configuration units of the digital device 100 can be implemented by a single chip or a plurality of chips according to a design of the digital device 100.

Figure 3:
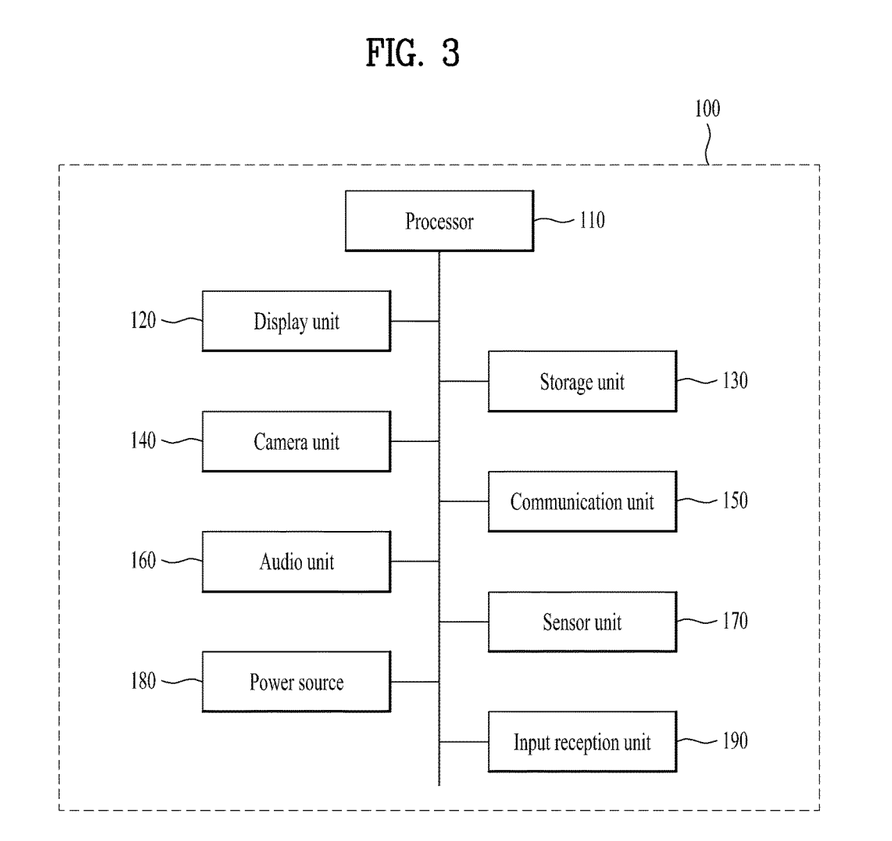
FIG. 3 is a block diagram for a digital device according to one embodiment.

FIG. 3 is a block diagram for a digital device according to one embodiment.

Meanwhile, a digital device 100 may further include components not depicted in FIG. 2. In the following, for clarity, explanation on overlapped components may refer to the description mentioned earlier with reference to FIG. 2.

The digital device 100 may include a camera unit 140. The camera unit 140 may include one or more cameras. A camera included in the camera unit 140 can be installed in a front side and/or a rear side of the digital device 100. The camera unit 140 can sense an image using infrared, ultraviolet and/or infrared.

The digital device 100 may include a communication unit 150. The communication unit 150 can communicate with an external device. The communication unit 150 can receive information from one or more external devices. The communication unit 150 performs communication via a wired network or a wireless network based on various protocols and can transmit/receive data. For instance, in order for the communication unit 150 to access a wireless network, the communication unit may use WLAN (wireless LAN), wireless LAN communication based on IEEE 802.11, Wibro (wireless broadband), Wimax (world interoperability for microwave access), HSDPA (high speed downlink packet access), Bluetooth, NFC (near field communication) standard or the like. And, the communication unit 150 can access the internet via a wired/wireless network.

The digital device 100 may include an audio unit 160. The digital device 100 may provide auditory feedback via the audio unit 160. The audio unit 160 may include one or more speakers.

The digital device 100 may include a sensor unit 170. The sensor unit 170 may include a GPS sensor, an image sensor, an infrared sensor, a motion sensor, a heartbeat sensor, a fingerprint sensor, a sound sensor, a touch sensor and/or a gyro sensor for example. And, the digital device 100 may sense context information of the digital device 100 based on a signal received from the sensor unit 170.

The digital device 100 may include power source 180. The power source 180 may include a disposable battery, a rechargeable battery and/or an energy storing means. Or, an external power source may supply power to the digital device 100.

The digital device 100 may include an input reception unit 190. The input reception unit 190 may sense a touch input, a voice input, a motion input and the like. And, the input reception unit 190 may include a physical button.

Meanwhile, a composition diagram of the digital device 100 shown in FIG. 3 corresponds to a block diagram according to one embodiment of the present specification. Blocks, which are represented in a manner of being divided, show hardware configuration units of the digital device 100 logically divided from each other. Hence, the aforementioned configuration units of the digital device 100 can be implemented by a single chip or a plurality of chips according to a design of the digital device 100. Moreover, the digital device 100 may further include such components not depicted in FIG. 3 as a housing and the like and the processor 110 can control the components shown in FIG. 3 and the components not shown in FIG. 3.

In the following description, if each step or operation performed in the digital device 100 is initiated or progressed by sensing of a user input, it is assumed that a process of generating a signal according to the sensed user input and a process of receiving the generated signal include explanation on the aforementioned process although the processes are not explained again. And, it is able to represent as the processor 100 controls the digital device 100 or at least one or more units included in the digital device 100 according to the user input. And, the processor 110 and the digital device 100 can be considered as identical to each other in the following description.

FIGS. 4A to 4D are diagrams for embodiments of a digital device.

One embodiment of a digital device 100 has been explained with reference to FIG. 1. Yet, for instance, the digital device 100 may have a form described in the following with reference to FIG. 4A to FIG. 4D.

Figure 4A:
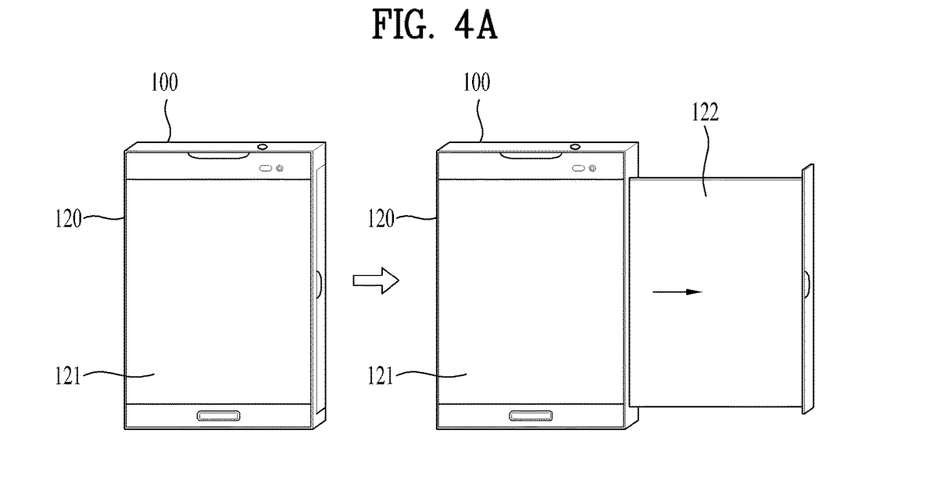
FIGS. 4A to 4D are diagrams for embodiments of a digital device.
Figure 4B:
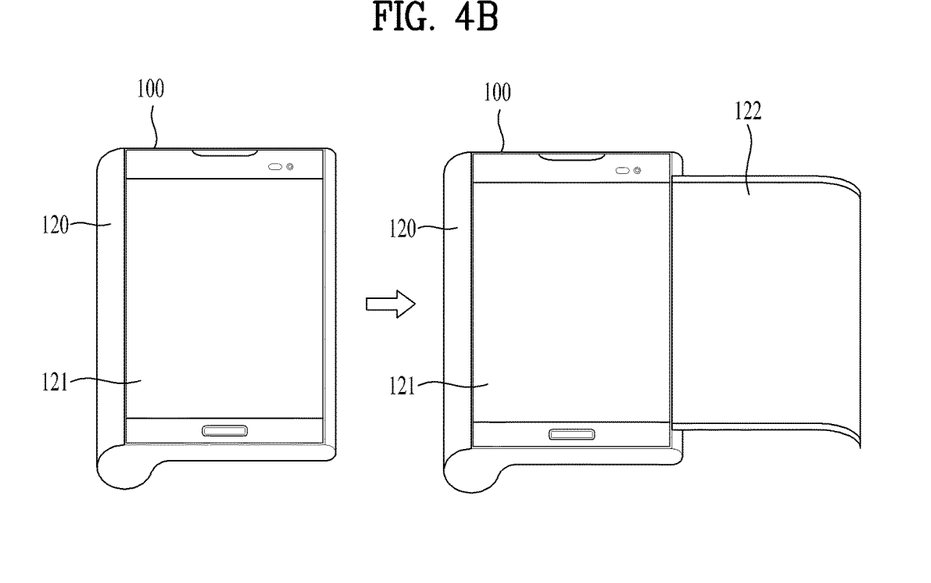
Figure 4C:
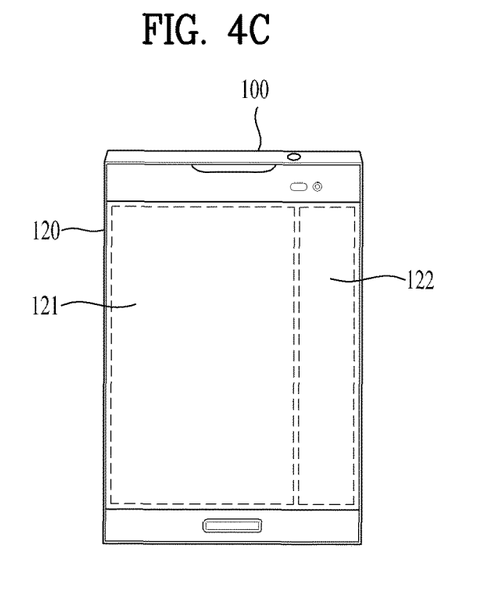
Figure 4D:
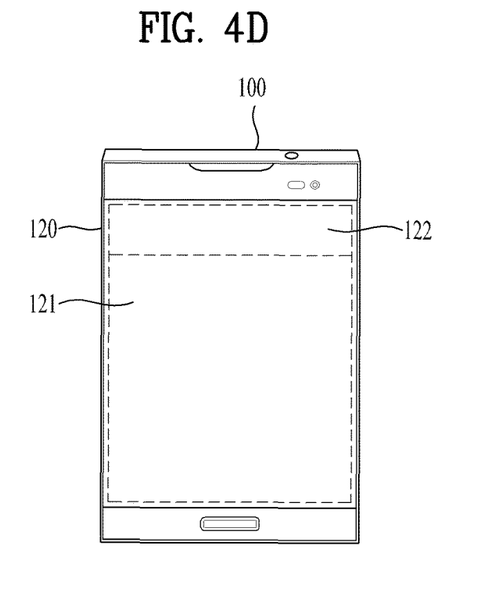

As shown in FIG. 4A, a sub display area 122 may correspond to an extendible display extended from a main display area 121. And, as shown in FIG. 4B, the sub display area 122 may correspond to a rollable display stored in the main display area 121. And, as shown in FIG. 4C, the sub display area 122 can be arranged at the right side of a display unit 120. And, as shown in FIG. 4D, the sub display area 122 can be arranged at the top of the display unit 120.

The main display area 121 and the sub display area 122 arranged on the display unit 120 have been explained with reference to FIG. 4A to FIG. 4D. Yet, the arrangement of the main display area 121 and the sub display area 122 may be non-limited by the aforementioned embodiments of the present specification.

Figure 5:
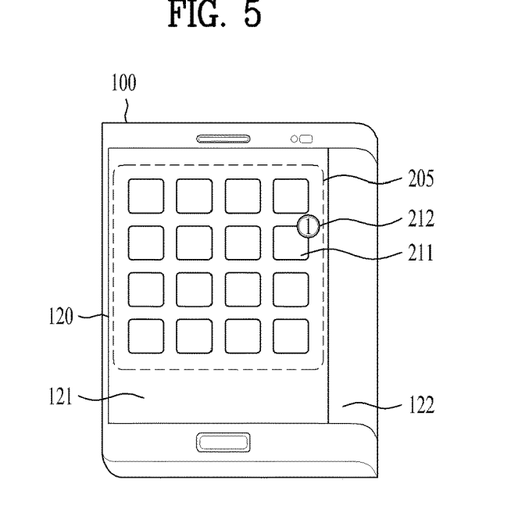
FIG. 5 is a diagram for displaying an indicator according to one embodiment.

FIG. 5 is a diagram for displaying an indicator according to one embodiment.

As shown in FIG. 5, a display device 100 can display a first icon set 205 including one or more icons corresponding to applications different from each other on a main display area 121. An application may include a widget. And, the digital device 100 can additionally display an indicator on an icon corresponding to an application in response to a notification on the application. For instance, in an embodiment shown in FIG. 5, the digital device 100 can display a first indicator 212 as well as a first icon 211 corresponding to an application including a notification. The first icon set 205 can include an icon including an indicator and/or an icon not including an indicator.

Figure 6:
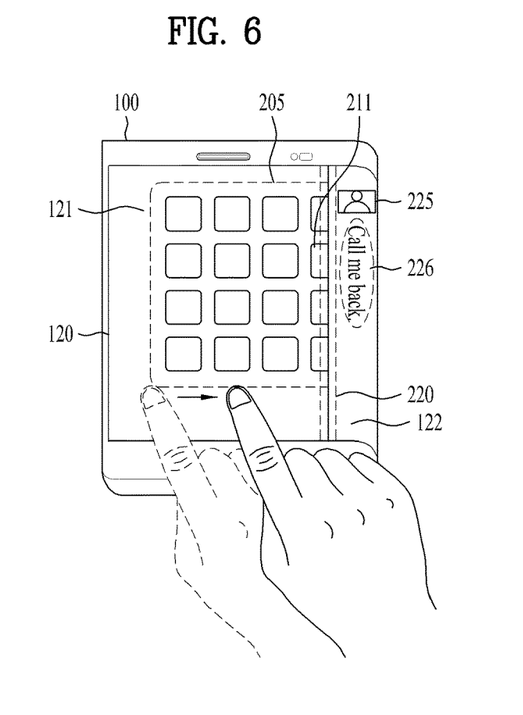
FIG. 6 is a diagram for displaying notification information according to one embodiment.

FIG. 6 is a diagram for displaying notification information according to one embodiment.

Referring to FIG. 6, a slide touch input inputted in a manner of sliding to a sub display area 122 from a main display area 121 is received. A display device 100 can move a first icon set 205 to a direction of the sub display area 122 based on the slide touch input. According to the movement of the first icon set 205, a first icon 211 including a first indicator is slid to a predetermined area 220. The predetermined area 220 is positioned in the vicinity of a boundary between the main display area 121 and the sub display area 122. A thickness, a shape and/or a position of the predetermined area may change according to a selection of a manufacturer and/or a user.

If the first icon 211 including the first indicator is slid to the predetermined area 220 based on the slide touch input, the digital device 100 may display first notification information 225 corresponding to the first indicator on the sub display area 122. And, the digital device 100 can display additional information 226 related to the first notification information together with the first notification information 225 on the sub display area 122. For instance, the first notification information 225 may correspond to information on a sender of a received message. And, the additional information may correspond to content of the received message. On the contrary, the first notification information 225 may correspond to the content of the received message. And, the additional information 226 may include at least one selected from the group consisting of the information on the sender of the received message, the content of the received message and a shortcut to a website related to a notification.

And, when the first notification information 225 is displayed on the sub display area 122, the digital device 100 can provide at least one selected from the group consisting of visual feedback, auditory feedback and tactile feedback.

And, the digital device 100 can display a second icon set (not depicted) arranged in the vicinity of the first icon set 205 on the main display area 121 based on a slide touch input. For instance, the digital device 100 may include a plurality of screens respectively including an icon set. A user may switch a screen into a different neighboring screen using a slide touch input.

For instance, the digital device 100 may determine switching to a second icon set based on speed of a slide touch input. The digital device 100 can detect the speed of the slide touch input. If the detected speed of the slide touch input is same or less than a predetermined speed, the digital device 100 may display notification information 225a/225c1/225c2 corresponding to an indicator on the sub display area 122. And, if the detected speed of the slide touch input exceeds the predetermined speed, the digital device 100 may switch the first icon set 205 into the second icon set (not depicted). On the contrary, if the detected speed of the slide touch input exceeds the predetermined speed, the digital device 100 may display notification information. If the detected speed of the slide touch input is same or less than the predetermined speed, the digital device may switch the first icon set into the second icon set (not depicted).

And, the digital device 100 may determine switching to the second icon set (not depicted) based on a length of a slide touch input. For instance, if the length of the slide touch input is same or less than a predetermined length, the digital device 100 may display notification information 225 of the first icon 211 on the sub display area 122. If the length of the slide touch input exceeds the predetermined length, the digital device 100 may switch the first icon set 205 into the second icon set (not depicted). On the contrary, if the length of the slide touch input is same or less than the predetermined length, the digital device 100 may switch the first icon set 205 into the second icon set (not depicted). If the length of the slide touch input exceeds the predetermined length, the digital device 100 may display the notification information 225 on the sub display area 122.

The embodiments mentioned earlier with reference to FIG. 6 can be selectively combined with each other. For instance, if a length of a slide touch input is same or less than a predetermined length and speed of the slide touch input is same or less than predetermined speed, the digital device 100 may display notification information 225 on the sub display area 122. On the contrary, if the length of the slide touch input exceeds the predetermined length or the speed of the slide touch input exceeds the predetermined speed, the digital device may switch a first icon set 205 into a second icon set (not depicted).

And, the embodiments mentioned earlier with reference to FIG. 6 can also be selectively combined with the embodiment mentioned earlier in FIG. 5.

Referring to FIG. 6, the digital device 100 the first notification information 225 based on directivity of a slide touch input and movement of a first icon 211. Yet, the display device 100 may select notification information to be displayed more based on a starting point of the slide touch input. For instance, as mentioned later with reference to FIG. 7A to FIG. 8, if the starting point of the touch input corresponds to an icon belonging to the first icon set 205, the digital device 100 can select the notification information to be displayed on the sub display area 122 based on the starting point of the touch input.

Figure 7A:
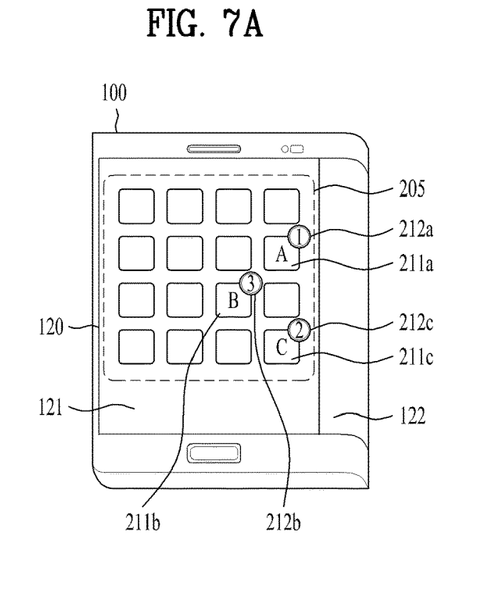
FIGS. 7A to 7B are diagrams for displaying notification information according to a different embodiment.
Figure 7B:
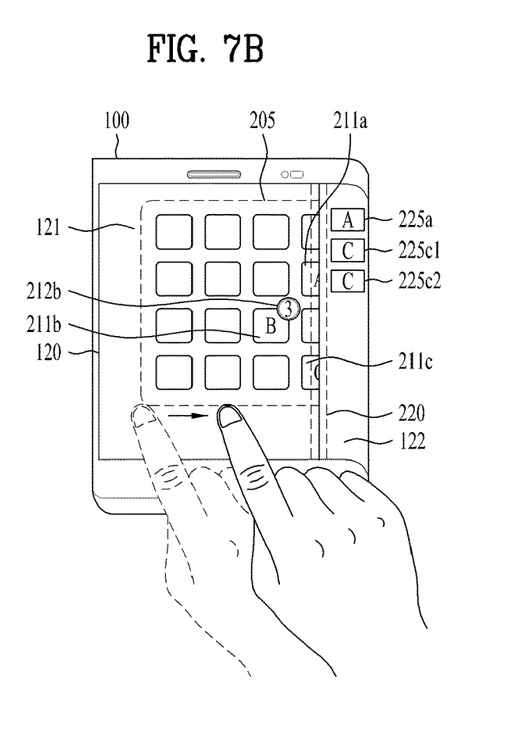

FIGS. 7A to 7B are diagrams for displaying notification information according to a different embodiment.

Referring to FIG. 7A, a first icon 211a corresponding to an application A included in a first icon set 205 includes a first indicator 212a. And, a second icon 211b corresponding to an application B includes a second indicator 212b. And, a third icon 211c corresponding to an application C includes a third indicator 212c.

Referring to FIG. 7B, a digital device 100 slides the first icon set 205 to a direction of a sub display area 122 based on a slide touch input. According to embodiment of FIG. 7B, a starting point of the slide touch input corresponds to an area positioned at the outside of the first icon set 205. In this case, if the first icon 211a and the third icon 211c are slid to a predetermined area 220, the digital device 100 may display first notification information corresponding to the first icon 211a and third notification information 225c1/225c2 corresponding to the second icon 211c on the sub display area 122.

Meanwhile, referring to FIG. 7B, the digital device 100 displays a plurality of information 225a/225c1/225c2 on the sub display area 122. In this case, the digital device 100 can display a plurality of the notification information on the sub display area 122 in a manner of arranging a plurality of the notification information in time order.

The embodiments mentioned earlier with reference to FIG. 7A and FIG. 7B can be selectively combined with embodiments explained with reference to FIG. 5, FIG. 6, FIG. 8 and FIG. 9.

Figure 8:
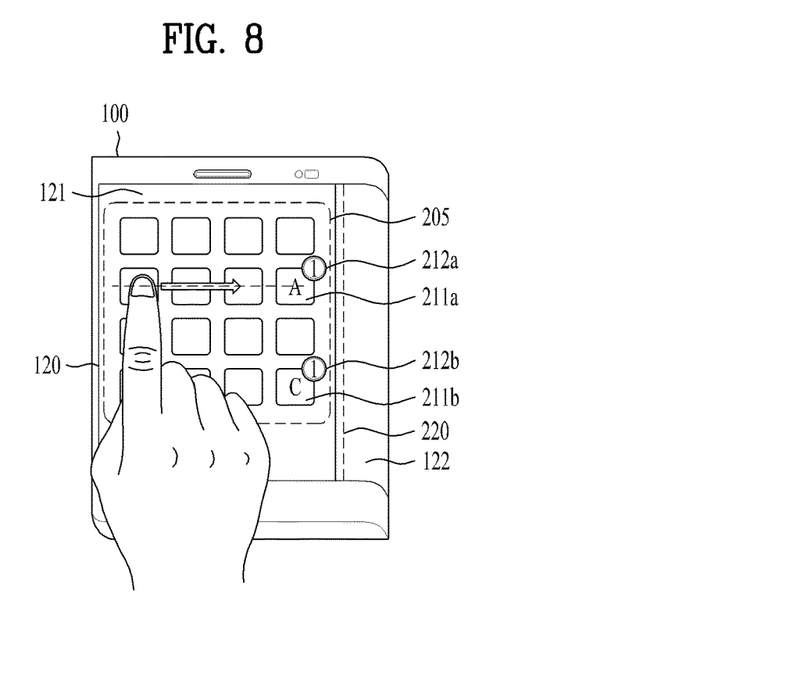
FIG. 8 is a diagram for selecting an indicator according to one embodiment.

FIG. 8 is a diagram for selecting an indicator according to one embodiment.

Referring to FIG. 8, unlike the starting point described in FIG. 7B, a starting point of a slide touch input corresponds to an icon included in a first icon set 205. If the icon corresponding to the starting point of the slide touch input is slid to a predetermined area 220 and the icon includes an indicator, a digital device 100 can display notification information of a corresponding application on a sub display area 122.

As shown in FIG. 8, icons belonging to the first icon set 205 are arranged according to columns and rows. Referring to FIG. 8, the starting point of the slide touch input corresponds to a position of a first column and a second row in the first icon set 205. The digital device 100 slides the first icon 211a and the second icon 211b to the predetermined area 220 based on the slide touch input. The first icon 211a and the second icon 211b include a first indicator 212a and a second indicator 212b, respectively. Yet, since the first icon 211a corresponds to the starting point of the touch input, the digital device 100 may display notification information corresponding to the first indicator of the first icon 211a only on the sub display area based on the slide touch input.

The embodiment mentioned earlier with reference to FIG. 8 can be selectively combined with embodiments of FIG. 5 to FIG. 7a, FIG. 7b and FIG. 9.

Figure 9:
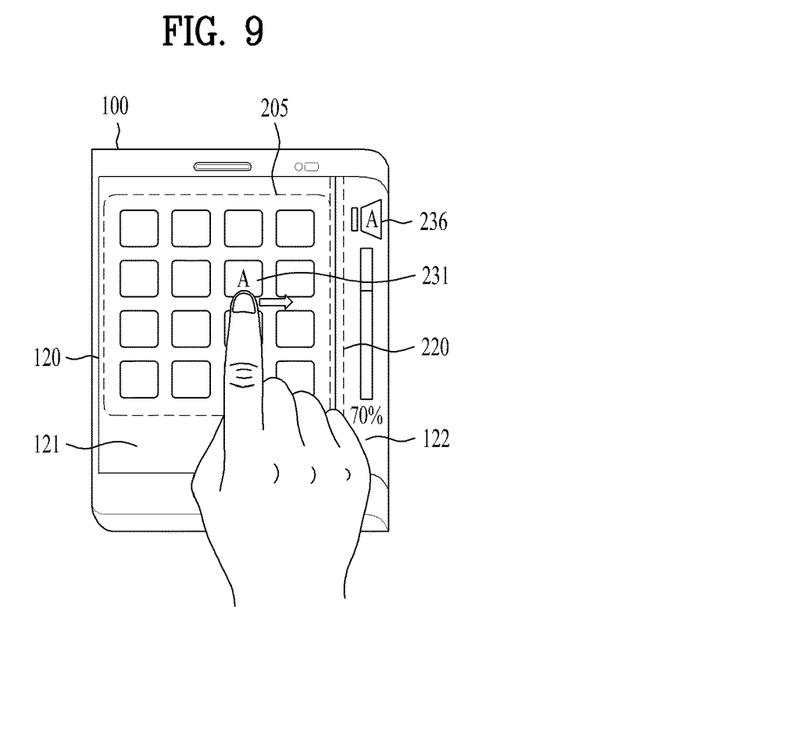
FIG. 9 is a diagram for selecting an application according to one embodiment.

FIG. 9 is a diagram for selecting an application according to one embodiment.

Referring to FIG. 9, a starting point of a slide touch input corresponds to a selected icon 231 in a first icon set. The selected icon 231 does not include an indicator according to notification. In this case, if the selected icon 231 is slid to a predetermined area 220 by the slide touch input, a digital device 100 can display additional information of an application corresponding to the selected icon 231 on a sub display area 122. For instance, as shown in FIG. 9, the digital device 100 may display application configuration 236. The additional information of the application can include at least one selected from the group consisting of configuration information of the application, an additional function of the application and a list of information browsed by the application.

The embodiment mentioned earlier with reference to FIG. 9 can be selectively combined with embodiments of FIG. 5 to FIG. 8.

Figure 10:
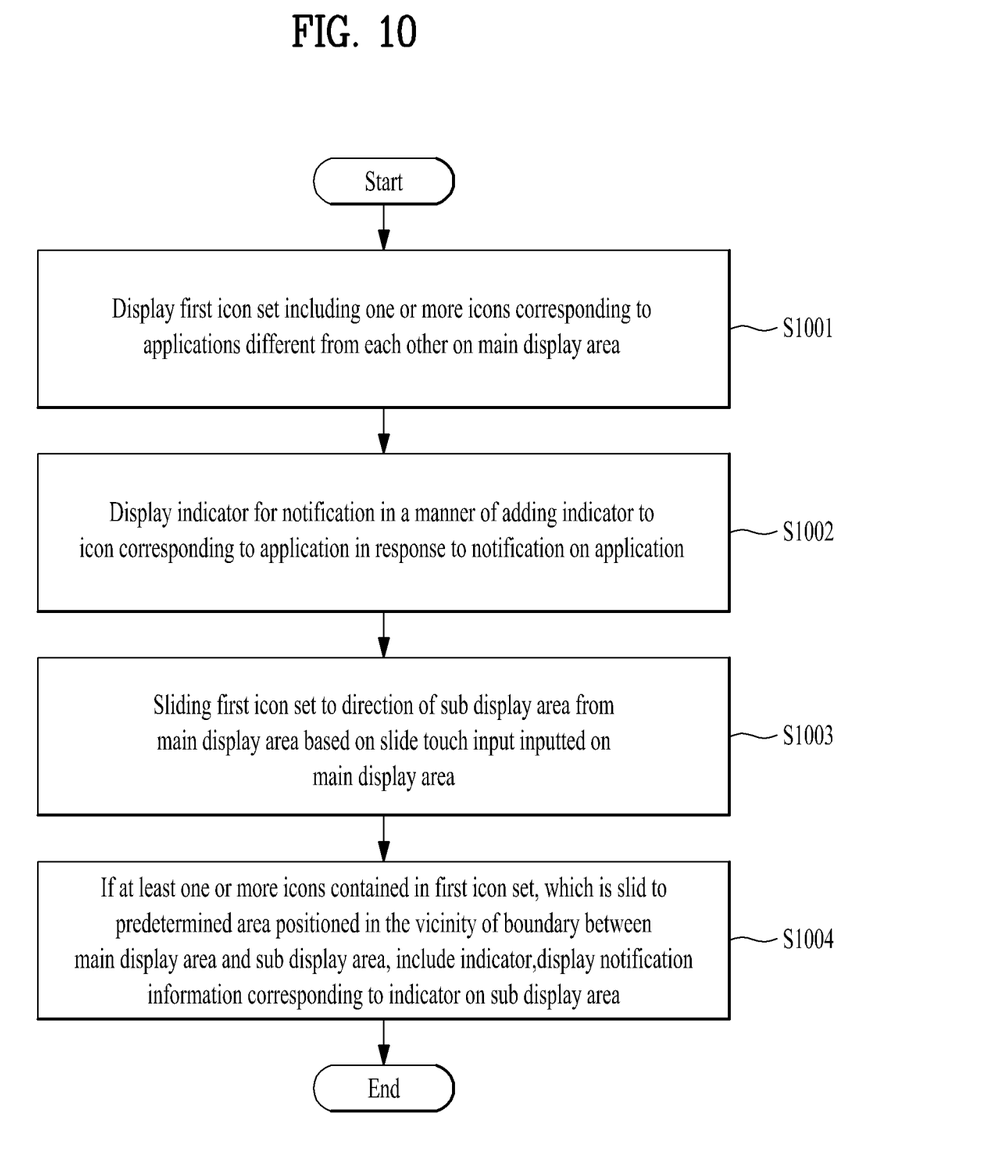
FIG. 10 is a flowchart for a method of controlling a digital device according to one embodiment.

FIG. 10 is a flowchart for a method of controlling a digital device according to one embodiment.

A digital device displays a first icon set including one or more icons corresponding to applications different from each other on a main display area [S1001]. The digital device includes the main display area and a sub display area. And, as mentioned earlier with reference to FIG. 1 to FIG. 4D, the main display area and the sub display area can be arranged in various positions.

Subsequently, the digital device displays an indicator for a notification in a manner of adding the indicator to an icon corresponding to an application in response to the notification for the application [S1002]. As mentioned earlier with reference to FIG. 5, the indicator can be indicated based on various notifications.

Subsequently, the digital device slides the first icon set to the sub display area from the main display area based on a slide touch input inputted on the main display area [S1003]. As mentioned earlier with reference to FIG. 6, the digital device can switch the first icon set into a second icon set based on a speed and/or a length of the slide touch input.

Subsequently, if at least one or more icons of the first icon set, which is slid to the predetermined area positioned in the vicinity of a boundary between the main display area and the sub display area, include an indicator, the digital device can display notification information corresponding to the indicator on the sub display area [S1004]. And, as mentioned earlier with reference to FIG. 7A to FIG. 8, the digital device can display notification information and/or additional information based on a starting point of a slide touch input. Moreover, as mentioned earlier with reference to FIG. 9, the digital device can display additional information of an application based on the starting point of the slide touch input.

A display device according to the present specification and a method of controlling therefor may be not limited to a configuration and method of the aforementioned embodiments. Instead, various modifications can be achieved in a manner that all or a part of each of the embodiments is selectively combined with each other.

Meanwhile, a display device according to the present specification and a method of controlling therefor can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A digital device, comprising:
    a memory configured to store data defining at least one of a specific function based on a relationship between a speed of a slide touch input and coordinate information of the slide touch input's starting point;
    a display unit configured to display one or more images, receive a touch input and contain a main display area and a sub display area, wherein the sub display area is positioned in a vicinity of the main display area and is positioned at an edge of the digital device; and
    a processor configured to:
    control the storage unit and the display unit,
    display a first icon set containing one or more icons corresponding to applications different from each other on the main display area,
    display an indicator for a notification in a manner of adding the indicator to an icon corresponding to an application in response to the notification on the application, wherein the first icon set comprises at least one of an icon to which the indicator is added and an icon to which the indicator is not added,
    slide the first icon set to a direction of the sub display area from the main display area based on a slide touch input inputted on the main display area,
    detect both a speed of the slide touch input and coordinate information of the slide touch input's starting point,
    switch the displayed first icon set into a second icon set on the main display area regardless of the slide touch input's starting point if the detected speed of the slide touch input exceeds a predetermined speed based on the data stored in the memory,
    display a specific icon's notification information corresponding to the indicator on the sub display area if the detected speed of the slide touch input is a same or less than the predetermined speed and the detected coordinate information corresponds to a position of the specific icon among the first icon set based on the data stored in the memory, and
    display notification information corresponding to the indicator of all icons having the indicator on the sub display area if the detected speed of the slide touch input is a same or less than the predetermined speed and the detected coordinate information does not correspond to a position of any icon among the first icon set based on the data stored in the memory.

2. The digital device of claim 1, wherein if a starting point of the slide touch input corresponds to an area belonging to the main display area except the first icon set and at least one or more icons of the first icon set slid to the predetermined area comprise the indicator, the processor is further configured to display the notification information corresponding to the indicator on the sub display area.

3. The digital device of claim 2, wherein if the starting point of the slide touch input corresponds to an icon contained in the first icon set, at least one or more icons among icons corresponding to the starting point are slid to the predetermined area and at least one or more icons among the icons corresponding to the starting point comprise the indicator, the processor is further configured to display notification information corresponding to the indicator of the icon corresponding to the starting point on the sub display area.

4. The digital device of claim 2, wherein the processor is further configured to display additional information related to the notification information on the sub display area together with the notification information.

5. The digital device of claim 4, wherein the additional information displayed on the sub display area comprises at least one selected from the group consisting of information on a sender of a received message, content of the received message and a shortcut of a website related to the notification.

6. The digital device of claim 2, wherein if the starting point of the slide touch input corresponds to a first icon contained in the first icon set and the first icon is slid to the predetermined area by the slide touch input, the processor is further configured to display additional information of an application corresponding to the first icon on the sub display area.

7. The digital device of claim 6, wherein the additional information displayed on the sub display area comprises at least one selected from the group consisting of configuration information of the application corresponding to the first icon, an additional function of the application and a list of information browsed by the application.

8. The digital device of claim 2, wherein the one or more icons contained in the first icon set are arranged according to rows and columns and wherein if the starting point of the slide touch input corresponds to an icon contained in a first row of the first icon set, at least one or more icons contained in the first row comprise the indicator and at least one or more icons contained in the first row are slid to the predetermined area, the processor is further configured to display notification information on the indicator of at least one or more icons, which are contained in the first row and contain the indicator.

9. The digital device of claim 1, wherein if a plurality of icons are slid to the predetermined area by the touch input and two or more icons among the plurality of the icons contain the indicator, the processor is further configured to display notification information on each of indicators for the two or more icons on the sub display area in a manner of arranging the notification information in time order.

10. The digital device of claim 1, wherein if a length of the slide touch input is same or less than a predetermined length, the processor is further configured to display the notification information corresponding to the indicator on the sub display area.

11. The digital device of claim 10, wherein if the length of the slide touch input exceeds the predetermined length, the processor is further configured to switch the displayed first icon set into a second icon set.

12. The digital device of claim 1, wherein the processor is further configured to:
   detect a length of the slide touch input,
   if the length of the slide touch input is less than a predetermined length and the detected speed of the slide touch input is same or less than predetermined speed, display the notification information corresponding to the indicator on the sub display area, and
   if the length of the slide touch input exceeds the predetermined length or the speed of the detected slide touch input exceeds the predetermined speed, switch the displayed first icon set into a second icon set.

13. The digital device of claim 1, wherein the sub display area comprises at least one selected from the group consisting of a flexible display, a retractable display and a stretchable display.

14. The digital device of claim 1, wherein the processor is further configured to provide at least one selected from the group consisting of a visual feedback, a tactile feedback and an auditory feedback when the notification information is displayed on the sub display area.

15. A method of controlling a digital device containing a main display area and a sub display area, wherein the sub display is positioned in a vicinity of the main display area and is positioned at an edge of the digital device, comprising the steps of:
   displaying a first icon set containing one or more icons corresponding to applications different from each other on the main display area;
   displaying an indicator for a notification in a manner of adding the indicator to an icon corresponding to an application in response to the notification on the application, wherein the first icon set comprises at least one of an icon to which the indicator is added and an icon to which the indicator is not added;
   sliding the first icon set to a direction of the sub display area from the main display area based on a slide touch input inputted on the main display area;
   detecting both a speed of the slide touch input and coordinate information of the slide touch input's starting point;
   switching the displayed first icon set into a second icon set on the main display area regardless of the slide touch input's starting point if the detected speed of the slide touch input exceeds a predetermined speed based on data stored in a memory, wherein the data defines at least one of a specific function based on a relationship between a speed of the slide touch input and coordinate information of the slide touch input's starting point; and
   displaying a specific icon's notification information corresponding to the indicator on the sub display area if the detected speed of the slide touch input is same or less than the predetermined speed and the detected coordinate information corresponds to a position of the specific icon among the first icon set based on the data stored in the memory, and
   display notification information corresponding to the indicator of all icons having the indicator on the sub display area if the detected speed of the slide touch input is a same or less than the predetermined speed and the detected coordinate information does not correspond to a position of any icon among the first icon set based on the data stored in the memory.

16. The method of claim 15, if a starting point of the slide touch input corresponds to an area belonging to the main display area except the first icon set and at least one or more icons of the first icon set slid to the predetermined area comprises the indicator, further comprising the step of displaying the notification information corresponding to the indicator on the sub display area.

17. The method of claim 16, if the starting point of the slide touch input corresponds to an icon contained in the first icon set, at least one or more icons among icons corresponding to the starting point are slid to the predetermined area and at least one or more icons among the icons corresponding to the starting point comprise the indicator, further comprising the step of displaying notification information corresponding to the indicator of the icon corresponding to the starting point on the sub display area.

* * * * *